(12) United States Patent
Giovannini et al.

(10) Patent No.: US 11,017,304 B2
(45) Date of Patent: May 25, 2021

(54) ORIGINAL IDEA EXTRACTION FROM WRITTEN TEXT DATA USING KNOWLEDGE GRAPHS

(71) Applicant: INTERNATIONAL BUSINESS MACHINES CORPORATION, Armonk, NY (US)

(72) Inventors: Andrea Z. Giovannini, Zurich (CH); Florian D. Graf, Zurich (CH); Markus Pelnar, Winterthur (CH); Stefan M. Ravizza, Wallisellen (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 878 days.

(21) Appl. No.: 15/797,741

(22) Filed: Oct. 30, 2017

(65) Prior Publication Data
US 2019/0130289 A1    May 2, 2019

(51) Int. Cl.
*G06N 5/04* (2006.01)
*G06F 16/901* (2019.01)
*G06F 40/30* (2020.01)
*G10L 15/26* (2006.01)

(52) U.S. Cl.
CPC .......... *G06N 5/04* (2013.01); *G06F 16/9024* (2019.01); *G06F 40/30* (2020.01); *G10L 15/26* (2013.01)

(58) Field of Classification Search
None
See application file for complete search history.

(56) References Cited

U.S. PATENT DOCUMENTS

| 7,646,903 B2 | 1/2010 | Kaftan et al. |
| 7,676,485 B2 | 3/2010 | Elfayoumy et al. |
| 8,260,642 B2 | 9/2012 | Bahrs et al. |
| 9,348,815 B1 | 5/2016 | Estes et al. |

(Continued)

FOREIGN PATENT DOCUMENTS

| JP | 2004213219 A | 12/2002 |
| WO | 2016206578 A1 | 12/2016 |

OTHER PUBLICATIONS

Sendhilkumar et al., Assessing Novelty of Research Articles Using Fuzzy Cognitive Maps, Intelligent Informatics, AISC 182, pp. 73-79, 2013 (Year: 2013).*

(Continued)

*Primary Examiner* — Alan Chen
(74) *Attorney, Agent, or Firm* — Michael O'Keefe; Matthew M. Hulihan; Heslin Rothenberg Farley & Mesiti PC

(57) ABSTRACT

Original idea extraction from written data is provided by capturing expression as written text data, obtaining a knowledge graph representing concepts and relationships between the concepts automatically topic modeling the written text data to ascertain thought units and identify respective concepts of the thought unit, mapping a thought unit to the knowledge graph, determining that the thought unit is an original idea based on a graph distance in the knowledge graph between correlated concepts represented in the knowledge graph, and based on determining that the thought unit is an original idea, storing a representation of the original idea to an idea repository and invoking processing of at least one computer.

22 Claims, 11 Drawing Sheets

(56) References Cited

U.S. PATENT DOCUMENTS

| | | | |
|---|---|---|---|
| 9,361,269 | B1 | 6/2016 | Todd et al. |
| 9,558,265 | B1 | 1/2017 | Tacchi et al. |
| 2010/0121629 | A1* | 5/2010 | Cohen ..................... G10L 13/00 704/2 |
| 2012/0290571 | A1* | 11/2012 | Lee ....................... G06Q 50/184 707/728 |
| 2015/0142820 | A1 | 5/2015 | Hatami-Hanza |
| 2015/0356151 | A1 | 12/2015 | Sanchez et al. |
| 2016/0224637 | A1 | 8/2016 | Sukumar et al. |
| 2016/0357870 | A1 | 12/2016 | Hentschel et al. |
| 2016/0371381 | A1 | 12/2016 | Elassaad |
| 2018/0349517 | A1* | 12/2018 | Kleiman-Weiner ... G06N 5/022 |
| 2019/0042988 | A1* | 2/2019 | Brown ............... G06Q 10/0631 |

OTHER PUBLICATIONS

Taneva et al., Gem-based Entity-Knowledge Maintenance, CIKM'13, Oct. 27-Nov. 1, 2013, San Francisco, CA, USA, pp. 149-158 (Year: 2013).*

Gannon, Graph-Based Text Representation for Novelty Detection, Workshop on TextGraphs, at HLT-NAACL 2006, pp. 17-24 (Year: 2006).*

Tsai et al., D2S: Document-to-sentence framework for novelty detection, Knowl Inf Syst (2011) 29, pp. 419-433 (Year: 2010).*

Breja, A Novel approach for Novelty Detection of Web Documents, (IJCSIT) International Journal of Computer Science and Information Technologies, vol. 6 (5), 2015, pp. 4257-4262 (Year: 2015).*

Sendhilkumar et al., Novelty Detection via Topic Modeling in Research Articles, ICCSEA, SPPR, CSIA, WimoA, SCAI—2013, pp. 401-410, 2013 (Year: 2013).*

Farber, Ontology-Supported Document Ranking for Novelty Search, ESWC 2013, LNCS 7882, pp. 639-644, 2013. (Year: 2013).*

Hixon, Ben, et al., "Learning Knowledge Graphs for Question Answering through Conversational Dialog", Human Language Technologies: The 2015 Annual Conference of the North American Chapter of the ACL, Denver, CO, May 31-Jun. 5, 2015, pp. 851-861.

Zhu, Ganggao, et al., "Computing Semantic Similarity of Concepts in Knowledge Graphs", IEEE Transactions on Knowledge and Data Engineering, vol. 29, No. 1, Jan. 2017, pp. 72-85.

Ciampaglia, Giovanni Luca, et al., "Computational Fact Checking from Knowledge Networks", PLOS ONE, DOI:10.1371/journal. pone.0128193, Jun. 17, 2015, 13 pgs.

Jinarat, Supakpong, "Graph-Based Concept Clustering for Web Search Results", International Journal of Electrical and Computer Engineering (IJECE), vol. 5, No. 6, Dec. 2015, pp. 1536-1544.

Peng, Wen-Chih, et al, "Trends and Applications in Knowledge Discovery and Data Mining", PAKDD 2014 International Workshops . . . , Tainan, Taiwan, May 13-16, 2014, 3 pgs.

Qi, Guilin, et al., "Linked Data and Knowledge Graph", Seventh Chinese Semantic Web Symposium and Second Chinese Web Science Conference, CSWS 2013, Shanghai, China, Aug. 2013, 4 pgs.

Arenas, Marcelo, et al., "The Semantic Web—ISWC 2015", 14th International Semantic Web Conference, Bethlehem, PA, Oct. 11-15, 2015, 2 pgs.

Mell, Peter, et al., "The NIST Definition of Cloud Computing", NIST Special Publication 800-145, Sep. 2011, Gaithersburg, MD, 7 pgs.

* cited by examiner

ORIGINAL IDEA EXTRACTION FROM WRITTEN TEXT DATA USING KNOWLEDGE GRAPHS

BACKGROUND

Individuals express ideas in various settings, including in conversations and other communications with others. Individuals express ideas between and among each other at conferences and other networking events, for instance both internal and external to an individual's business or work setting. Networking with others both during and after can be an important aspect of conferences and other business events.

Current approaches do not facilitate the identification of original ideas in an automatic and systematic manner. For instance, current approaches do not link what is being expressed by users with a predefined corpus of information to detect originality and commonalities in ideas expressed by individuals. In a particular approach, a large table is used to find co-occurrences of a same term in various social media posts and create a direct relationship between them to improve a search result. However, there is no cognitive component to find and link new ideas and the individuals expressing them. Furthermore, the filtering of new ideas and linking together individuals expressing similar original ideas is not provided.

SUMMARY

Aspects described herein support the identification of original ideas in an automatic and systematic manner. This advantageously enables, for example, networking of people with other people having similar ideas and potentially differing backgrounds to foster collaboration and innovation. Although some aspects are described in the context of conversations at a conference or other event, the disclosure is not limited to this specific application and instead supports the extraction of novel/original ideas and assistance in networking individuals from any settings.

Shortcomings of the prior art are overcome and additional advantages are provided through the provision of a computer-implemented method. The method electronically captures expression of one or more individuals as written text data using one or more electronic devices. The method obtains a knowledge graph data structure for a knowledge dataset, the knowledge graph including representations of concepts and relationships between the concepts as identified from the knowledge dataset. The method automatically topic models the written text data to ascertain thought units expressed in the written text data, and identifies, for each thought unit, a respective set of concepts of the thought unit. The method maps a thought unit of the thought units to the knowledge graph by correlating the concepts of the thought unit to a correlated set of concepts represented in the knowledge graph. The method determines that the thought unit is an original idea based on a graph distance in the knowledge graph between at least some of the correlated concepts represented in the knowledge graph. The method also, based on determining that the thought unit is an original idea, storing a representation of the original idea to an idea repository and invoking processing of at least one computer. The method has an advantage that it enables links between what is being expressed and already existing concepts derived from a corpus of information to detect novelty and commonalities among ideas.

Further, a computer system is provided that includes a memory and a processor in communication with the memory, wherein the computer system is configured to perform a method. The method electronically captures expression of one or more individuals as written text data using one or more electronic devices. The method obtains a knowledge graph data structure for a knowledge dataset, the knowledge graph including representations of concepts and relationships between the concepts as identified from the knowledge dataset. The method automatically topic models the written text data to ascertain thought units expressed in the written text data, and identifies, for each thought unit, a respective set of concepts of the thought unit. The method maps a thought unit of the thought units to the knowledge graph by correlating the concepts of the thought unit to a correlated set of concepts represented in the knowledge graph. The method determines that the thought unit is an original idea based on a graph distance in the knowledge graph between at least some of the correlated concepts represented in the knowledge graph. The method also, based on determining that the thought unit is an original idea, storing a representation of the original idea to an idea repository and invoking processing of at least one computer. The computer system has an advantage that its processing enables links between what is being expressed and already existing concepts derived from a corpus of information to detect novelty and commonalities among ideas.

Yet further, a computer program product including a computer readable storage medium readable by at least one processor and storing instructions for execution by the at least one processor is provided for performing a method. The method electronically captures expression of one or more individuals as written text data using one or more electronic devices. The method obtains a knowledge graph data structure for a knowledge dataset, the knowledge graph including representations of concepts and relationships between the concepts as identified from the knowledge dataset. The method automatically topic models the written text data to ascertain thought units expressed in the written text data, and identifies, for each thought unit, a respective set of concepts of the thought unit. The method maps a thought unit of the thought units to the knowledge graph by correlating the concepts of the thought unit to a correlated set of concepts represented in the knowledge graph. The method determines that the thought unit is an original idea based on a graph distance in the knowledge graph between at least some of the correlated concepts represented in the knowledge graph. The method also, based on determining that the thought unit is an original idea, storing a representation of the original idea to an idea repository and invoking processing of at least one computer. The computer program product has an advantage that execution of the instruction enables links between what is being expressed and already existing concepts derived from a corpus of information to detect novelty and commonalities among ideas.

Additional features and advantages—optional, permissive, preferred, and/or advantageous—are realized through the concepts described herein.

The capturing of the expression as written text data can include transforming a voice stream of a user to a textual representation of the voice stream. Additionally or alternatively, the capturing expression as written text data can include transforming at least drawings and/or user gestures, to a textual representation. These have an advantage that the expressions can be received in any of a variety of formats and aspects described herein applied thereto in order to identify original ideas from those expressions.

The knowledge graph can be an extended knowledge graph. The obtaining of the extended knowledge graph can further include obtaining an initial knowledge graph based on the knowledge dataset. Obtaining the extended knowledge graph can further include extending the initial knowledge graph based on a specific technical or scientific domain to obtain the extended knowledge graph. The extending can add representations of additional domain-focused concepts and/or additional domain-focused relationships between concepts represented in the initial knowledge graph. This has an advantage that it enables tailoring or specializing the knowledge graph to a specific domain, to thereby tailor the identification of ideas that may be original for that domain.

The concepts of the thought unit can include concepts explicitly expressed in the written text data as the thought unit and one or more concepts identified from a context in which the thought unit was expressed. This has an advantage that concepts which are implied but not necessarily expressly stated may augment the thought unit and factor into whether a thought unit is considered an original idea.

The thought unit may be characterized by an identification of an individual expressing the thought unit, the identified concepts of the thought unit, at least one sentiment score of the thought unit, and an indication of any other individuals receiving a communication in which the thought unit was expressed by the individual. This has an advantage that thought units have associated properties (e.g. concepts, sentiments) that can be used in the identification of originality and properties (e.g. sentiments, indication of involved individuals) that can be used in determining whether to network individuals together.

The determining that the thought unit is an original idea can include determining, for each pair of concepts of the correlated concepts represented in the knowledge graph, a respective shortest graph distance between the pair of concepts. The determining the respective shortest graph distance between the pair of concepts can also include determining whether a shortest graph distance between a pair of concepts of the correlated concepts represented in the knowledge graph exceeds a threshold. The thought unit may be deemed an original idea based on determining that the shortest graph distance between the pair of concepts exceeds the threshold. This has an advantage that the determination of originality may be tailored as desired using thresholding and based on distances between concepts.

The determining that the thought unit is an original idea can further include determining whether each shortest graph distance between at least one additional pair of concepts of the correlated concepts represented in the knowledge graph exceeds the threshold. The thought unit may be deemed an original idea based on determining that each shortest graph distance between the at least one additional pair of concepts exceeds the threshold. This has an advantage that the determination of originality can be tailored as desired to require several instances of the expression of relatively distant concepts, providing greater confidence that an expressed idea is original.

The determining that the thought unit is an original idea may be further based on a cardinality of the set of concepts of the thought unit exceeding a threshold, which has an advantage that it enables tailoring of a complexity requirement (number of concepts expressed) for the thought units in the identification of original ideas.

In some embodiments, a method further includes assigning relevance scores to the concepts of the thought unit, and the determining that the thought unit is an original idea may be further based on the relevance scores assigned to the concepts. Additionally or alternatively, obtaining the knowledge graph can further include assigning weights to the concepts represented in the knowledge graph, and the determining that the thought unit is an original idea may be further based on the weights assigned to the correlated concepts represented in the knowledge graph. The weight assigned to a concept represented in the knowledge graph may be based on an area of innovation to which the concept pertains and/or a frequency or trend in coverage of the concept in news media, as examples. These aspects have an advantage that they enable different concepts to contribute differently to the determination of originality, enabling concepts to be emphasized and deemphasized as desired to influence the prominence and contribution requirement for some concepts in identified original ideas.

The invoking processing of at least one computer can invoke provision of a graphical user interface that indicates the representation of the original idea to an individual, of the one or more individuals, who expressed the thought unit, to notify the individual that the thought unit is an original idea. This has an advantage that the original ideas the users express can be electronically presented to them.

In some embodiments, a method includes comparing the thought unit to other thought units determined to be original ideas and having representations thereof stored in the idea repository. The method may also include identifying another thought unit, of the other thought units, for which the thought unit and the another thought unit share a common pair of concepts represented in the knowledge graph. The one or more individuals can include a first individual who expressed the thought unit and a second individual who expressed the another thought unit. These aspects have an advantage that correlation of same/similar ideas can be leveraged to bring together the idea generators.

Based on determining that the expression of the thought unit by the first individual and expression of the another thought unit by the second individual were not made in a common conversation between the first individual and second individual, the invoking processing of the at least one computer can include providing a first electronic communication to a first computer of the first individual and providing a second electronic communication to a second computer of the second individual, the first and second electronic communications to network together the first and second individuals. These have an advantage that aspects can network individuals with other individuals having similar ideas to foster collaboration and innovation, and an advantage of refraining from attempting to network individuals who are already networked by virtual of them being involved in the conversation.

In some embodiments, a method includes ascertaining a first sentiment score of the thought unit and a second sentiment score of the another thought unit. The method can also include determining whether to network together the first and second individuals based on the first and second sentiment scores. These aspects have an advantage that they enable tailoring which individuals are introduced to each other based on their sentiments. This can advantageously give selectability and control to bring together individuals with common sentiments, opposing sentiments, or some other desired relation between their expressed sentiments. The tone and sentiments in the fostered meaningful discourse may be controlled in this manner.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
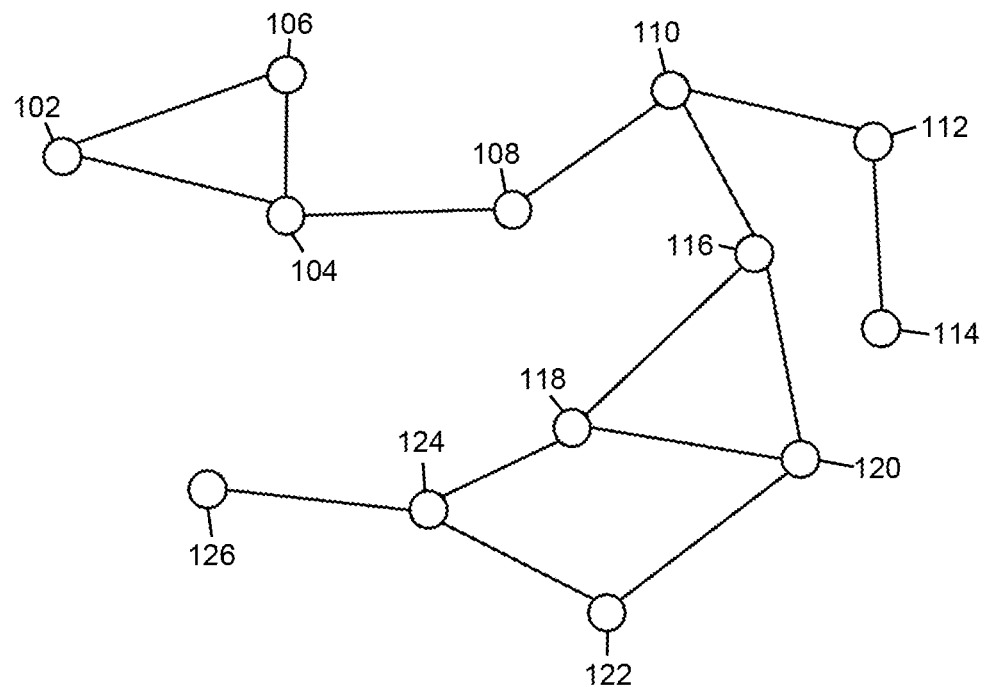
FIG. 1 depicts an example knowledge graph in accordance with aspects described herein.

Described herein are facilities for processing written text data to extract original ideas, relative to a knowledge dataset, based on expression input from one or more individuals. Additional aspects can electronically present the original ideas to one or more individuals, for instance in an effort to link individuals who expressed same or similar ideas and may not have otherwise been aware of their common expressions.

Input to be analyzed, the input coming from individual users, can be received from different sources and potentially from one or more locations. Some input may be written documents, corporate wide blogs, emails, public information on the Internet, communications, or the like from the individuals. This input may be stored as written text data. Other input may be captured, transformed into written text data, and stored as such. One example other input may be audio data, such as a voice stream of the individual speaking, which may be captured using one or more microphones and then transformed into written text data. Another input may be drawings, sketches, or other pictorial expressions that may be analyzed and abstracted, tagged or otherwise expressed into written text form. Yet another input may be gestures made by the individual, the gestures captured using one or more sensors, such as camera devices, and transformed into written text data. In this manner, many different types of sensors or other devices can capture expression of the user (whatever the electronic format thereof, and if needed, transform the expression) in a written text form.

The written text data may be further abstracted into so called concepts which can norm wordings. As an example, a concept could be "New York" and words/phrases like "Big Apple" or "NY" are mapped to "New York" as they may be considered synonyms represented with the phrase "New York".

If an individual mentions or expresses a collection of different concepts together but, based on a general or specific knowledge dataset, some concepts do not appear to be closely related, the combination of concepts may be considered an original, novel, potentially new idea. A representation of the idea may be stored and used in any of various ways. As an additional aspect, if two or more individuals express same or similar original ideas but are not yet linked together, the individuals may be networked by a networking assistant.

Accordingly, provided are capabilities of identifying novel ideas characterized by the new composition of known component concepts, bridging similar novel ideas, and bringing together the individuals expressing those novel ideas.

A knowledge graph is introduced that includes nodes and edges, where nodes represent concepts and two nodes are linked with an edge if the concepts represented by the nodes are considered related to each other. A baseline for a comprehensive knowledge graph can be derived from a knowledge dataset, such as a dataset of encyclopedic knowledge. One example knowledge dataset is a collection of online articles, such as those provided by Wikipedia. Using this example, each Wikipedia entry (page on a given topic) may be a concept represented as a node, and an edge is drawn between two nodes if the two corresponding pages link to, mention, or describe each other.

In some examples, an initial knowledge graph is built from an online dataset or obtained, already built, from another source, and then extended with more relevant details of a specific domain, such as an industry-specific, technology-specific, or science-specific domain. An example specific domain is as specific academic or non-academic journal. In extending the initial knowledge graph, additional nodes (representing additional concepts) may be added to the knowledge graph and/or additional edges may be drawn between nodes (representing additional linkages between concepts) as identified in the specific-domain that is extending the knowledge graph. In some examples, it is an existing enterprise-wide (non-public) knowledge graph that is extended as desired.

FIG. 1 depicts an example knowledge graph in accordance with aspects described herein. The knowledge graph may be implemented as one or more databases/data structures of one or more computer systems. The data structures may be implemented to enable efficient exploration and traversal thereof to facilitate searching and processing of the knowledge graph.

Show in FIG. 1 are thirteen nodes (representing thirteen distinct concepts) labeled 102 through 126, and fifteen edges representing relationships (e.g. linkages) between the thirteen nodes. An edge is drawn between two nodes based on the presence of some relation between the two corresponding concepts. In FIG. 1, edge 103 represents a relationship between the two distinct concepts represented by nodes 102 and 104.

A thought unit is considered a setting of an input from an individual about a specific topic. This can be a paragraph in a text document or within a discussion, as examples. More generally, the thought unit may be the input (expression) from an individual person until there is a topic change in the conversation, text document, or other expression.

A thought unit can be extended with overarching concepts that may not be explicitly expressed but may be implied from a context in which the expression occurs. For instance, if the expression is an audio stream of a conversation involving two people at an industry conference, then, although neither person expresses the overall purpose or subject of the conference, that might be added as a concept to each thought unit expressed by either of the two people.

In a particular embodiment, a thought unit (TU) is expressed as follows:

$$TU=(P_i, \text{Time}, \{concept_1, \ldots, concept_n\}, sentiment_{positive}, sentiment_{negative}, \{P_k, \ldots, P_1\})$$

$P_i$ is an identification of an i-th individual who expressed the thought unit. Time is a time stamp (e.g. day, time) when the thought unit was started. {concept1, . . . , concept} are the n extracted concepts within the thought unit. Sentiment$_{positive}$ and sentiment$_{negative}$ are values representing or highlighting positive and/or negative sentiments associated to the thought unit (e.g. a thought unit can a value for positive sentiment and a value for negative sentiment associated therewith). $\{P_k, \ldots, P_1\}$ is a list of any other individuals who were involved in the discussion/expression when the $P_i$ individual expressed this thought unit.

Generally, a process for original idea extraction from written text data is as follows: Using a preprocessed (e.g. built up-front or pre-established) knowledge graph, map concepts from a particular thought unit to the knowledge graph. Analyze whether the concepts of the thought unit build an original idea. This is done by measuring whether concepts are sufficiently distant from each other in terms of their relation to each other as indicated in the knowledge graph. If the thought unit constitutes an original idea, add the original idea (e.g. a digital representation thereof) to an idea pool, such as one stored on a storage device. This practice is termed idea extraction. Additionally, if it is determined that more than one person has expressed the same or a similar original idea (e.g. similarity dictated by whether the two corresponding thought units share one or more edges in the knowledge graph), then this indicates the individuals expressed the same/similar idea. The process can connect these individuals, acting as a networking assistant, for collaboration.

In some examples, the decision to network two individuals can be based on the sentiments of their respective thought units. On the one hand, it may be desired to electronically communicate with and network together two individuals who expressed the same/similar idea with similar positive sentiments. On the other hand, it may be interesting to electronically communicate with and network together two individuals who expressed opposing sentiments in the overlapping thought units.

Additionally or alternatively, it can be ascertained whether overlapping thought units were expressed by two individuals involved in the same conversation, discussion, or the like. If so, networking of those individuals may be avoided on the basis that they have already networked or collaborated relative to the idea.

Figure 2:
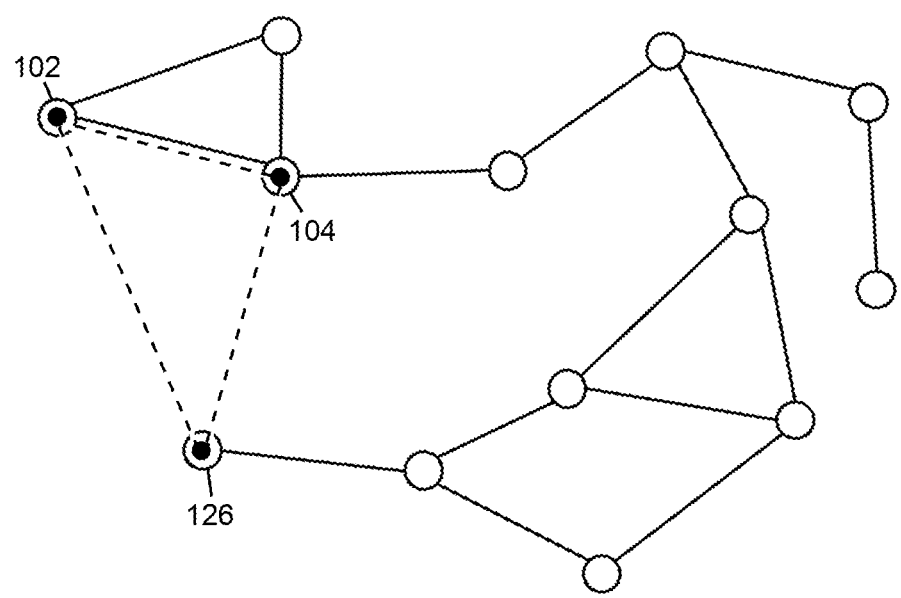
FIG. 2 depicts the example knowledge graph of FIG. 1 and illustrates a thought unit mapped to the knowledge graph, in accordance with aspects described herein.

Aspects of idea extraction are described with reference to FIGS. 2 and 3. Generally, input from a person is first mapped into different concepts that are represented as nodes within a knowledge graph. FIG. 2 depicts the example knowledge graph of FIG. 1 further illustrating a thought unit mapped to the knowledge graph, in accordance with aspects described herein. In FIG. 2, the thought unit of the person is visualized as a collection of three different concepts, i.e. the concepts represented by nodes 102, 104 and 126 and connected using dashed lines in FIG. 2. The thought unit is mapped to the knowledge graph (nodes thereof) by correlating the concepts of the thought unit to a correlated set of concepts represented in the knowledge graphs. Here, the correlated set of concepts are represented by nodes 102, 104, and 126.

The thought unit indicated in FIG. 2 is identified from a topic expressed by the person. By way of a first specific example, the system captured a conversation involving the person and the person spoke, discussed, or otherwise expressed the three concepts as part of a single topic. By way of a second specific example, the system analyzes a paragraph of text written by the person and the paragraph mentions the three concepts indicated.

As a next step, graph distances in the knowledge graph between the correlated concepts are ascertained and used in determining whether the thought unit is an original/novel idea. By way of specific example, for each pair of concepts in the thought unit (i.e. represented by the correlated concepts in the knowledge graph), a length of the shortest path between that pair is determined. One efficient option to determine such a shortest path between a pair of nodes in a graph is by utilizing Dijkstra's algorithm.

Figure 3:
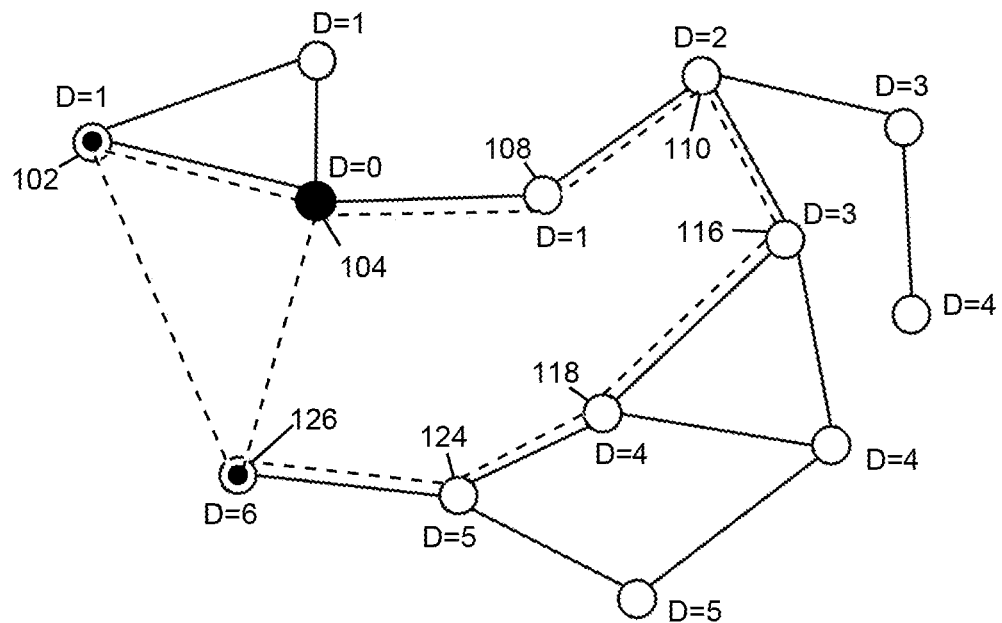
FIG. 3 depicts the knowledge graph of FIG. 2 and illustrates distance measures from a node of the thought unit to the other nodes of the thought unit, in accordance with aspects described herein.

FIG. 3 depicts the knowledge graph of FIG. 2 and illustrates distance measures from a node of the thought unit to the other nodes of the thought unit, in accordance with aspects described herein. FIG. 3 shows distance measures, D=_, from node 104 to all other nodes in the knowledge graph, the distance measures being the length of the shortest path to the target node from node 104. Thus, FIG. 3 depicts a visualization of the shortest path from one concept (represented by node 104) to each of the two other concepts (represented as nodes 102 and 126) using only the edges of the knowledge graph. Specifically, the shortest path {104-108-110-116-118-124-126} between nodes 104 and 126 is shown as a dashed line connecting node 104 to node 126, and shortest path {104-102} between nodes 104 and 102 is shown as a separate dashed line in FIG. 3.

With this approach, a set of graph distances—distances of the shortest paths between concepts as represented by nodes of the knowledge graph—is obtained. This set is denoted: {shortest path (i,j)} for all i,j existing in the thought unit. A maximum shortest path between all the concepts of the thought unit is the maximum distance in the set of graph distances, and can be represented as:

$$\max_{i,j \in concepts\ in\ TU} \{\text{shortest path } (i, j)\}$$

The above expression indicates the distance/length of the maximum shortest path between pairs of concepts of the thought unit. In some embodiments, this particular shortest graph distance is used to determine whether the thought unit is considered original. The greater the distance between concepts in a knowledge graph, the less directly these concepts relate to each other. This may be based on threshold(s). So, by way of example, if the maximum shortest graph distance exceeds some certain threshold value (e.g. 5), the combination of concepts (104, 126) is seen as novel and hence the entire thought unit (102, 104, 126) is considered a novel idea.

Various other approaches are possible for determining whether a thought unit is original. One approach considers a thought unit original only if the shortest distances between several different pairs of concepts of the thought unit exceed the given threshold. In the example above, it may be required that two different pairs of concepts have a respective shortest distance exceeding 5.

Yet another approach involves a more complex function that might account for the number of considered concepts within a thought unit (i.e. a cardinality—number of elements—in the set of concepts included in the thought unit).

Networking aspects are also provided to network individuals together who have expressed original thought units that overlap in terms of concepts. The individuals expressing these thought units may be contacted by a network assistant via electronic communications to network the individuals together.

Figure 4:
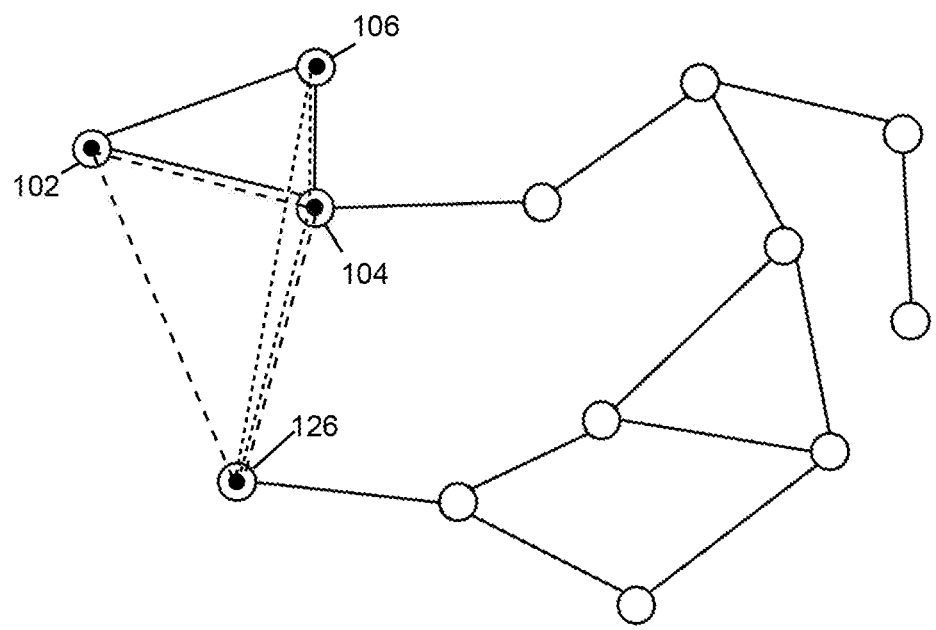
FIG. 4 depicts the knowledge graph of FIG. 2 and illustrates two thought units sharing concepts represented in the knowledge graph, in accordance with aspects described herein.

FIG. 4 depicts the knowledge graph of FIG. 2 and illustrates two thought units sharing concepts represented in the knowledge graph, in accordance with aspects described herein. In FIG. 4, one thought unit expressed by a first person encompasses concepts 102, 104 and 126 (shown connected by long-dashed lines). As explained above, this thought unit is found to be original on the basis that the shortest distance between nodes 104 and 126 exceeds the threshold of 5. A second thought unit expressed by a second person encompasses concepts 104, 106 and 126 (shown connected by short-dashed lines). This second thought unit also constitutes an original idea because it too includes nodes 104 and 126, which have a shortest distance of 6 between them, and 6 exceeds the threshold set at 5. There is overlap between the thought units in terms of the concepts they both include (104, 126).

The networking aspects can be further extended to account for the particular sentiment(s) of thought units and network the individuals only if the thought unit sentiments, either positive or negative sentiments, are sufficiently in alignment (for instance both positive) with each other or satisfy some other sentiment goal. In an alternative embodiment, the sentiment goal may be to match individuals with opposing sentiments about a given idea or combination of concepts. It may be desired to match such individuals if sentiments are sufficiently different, for instance one person who expresses a largely positive sentiment in expressing a first thought unit with another person who expresses a largely negative sentiment in expressing a second thought unit that overlaps the first thought unit. Since sentiments may be expressed as values, comparison between sentiment values may be made in any desired manner, for instance using percentages or thresholds for dictating whether sentiments are sufficiently similar or different.

Additionally or alternatively, networking of two individuals together may consider whether the two individuals were involved in a common expression (conversation, discussion, co-authored document, etc.). If they were involved in the same conversation or other common expression, then it may not be of any value to network them together because they apparently already have a connection by virtue of their collaboration that produced the expressions from which their overlapping thought units were extracted.

As noted, sentiment analysis can be applied to a thought unit. Known algorithms and techniques can provide positive and negative sentiment values for a phrase, sentence, paragraph, etc., the sentiment values corresponding to, for instance, positive and negative wordings used in the expression. In some embodiments, the sentiment output is either neutral, positive, negative, or mixed. Additionally or alternatively, a sentiment scale may be generated, for instance one ranging from −10 (most negative sentiment) to +10 (most positive sentiment). In addition to possibly using the sentiment in the networking aspects described above, another enhancement uses the sentiment information to dictate which ideas (e.g. only positive or only very positive) are to be extracted and stored as original ideas.

Various scores of concept relevance may be implemented and used in various manners. For instance, indicators of relevance of the concepts may be incorporated within a thought unit, in which each concept is measured with a relevance score, for instance how relevant the concept is compared to other concepts within the thought unit. One way of measuring the relevance of a given concept within a thought unit is to count how often the concept was mentioned in the expression of the thought unit. This may include counting references to "it" when it is clear what concept "it" refers to. The relevance score can be integrated into the determination of whether or not concepts are original. For instance, originality of a thought may be dictated in part based on some concept of the thought unit having a minimum relevance score.

The knowledge graph can indicate relevant concepts if desired. In this manner, a thought unit touching on highly relevant concept(s) in the knowledge graph may more easily be deemed original if it incorporates a highly relevant concept in the knowledge graph. The relevance may be implemented as an extension to the knowledge graph to add weights to the concepts. Each node of the knowledge graph can have a certain relevance determined based on a pre-processing step. One approach is to use hype cycle research methodology (for instance that provided by Gartner Inc., Stamford, Conn., U.S.A.) to identify which concepts match to innovative areas and should therefore be prioritized for idea extraction. Another approach is to count the frequency of each concept in news and other media publications for a fixed relevance score, or focus on the change over time of this frequency to identify trends on which to base the setting of set relevance scores.

One practical use case for aspects described herein is its application to conferences or larger meetings where different groups of people discuss new ideas, perhaps during breaks or intermissions, in the context of the conference/meeting topics that are the subject of the conference or meeting. Such a scenario is an opportunity to extract, match, and interconnect the conference participants. As an example, microphones, cameras, and/or other sensors or devices are positioned in the physical environment, for instance on tables around which individuals meet, and such sensors/device capture expressions of the individuals. This data may be gathered to a central location/backend computer system(s) for processing. A central repository may be provided where the harvested ideas are stored and potentially processed. It is noted that various types of input devices like smart wearables such as eyewear gadgets or smart watches, or more widely distributed devices like smart phones, tablets or computers with a microphone may be used to capture expressions and/or perform some of the processing described herein to ascertain thought units, map to a knowledge graph, determine whether ideas are original, and network individuals together.

Automation for idea extraction can proceed by way of receiving input via an application programming interface (API) allowing to transmit voice, text, and other digitally captured expressions. How this input is gathered is independent of the application of the extraction itself. A central cognitive instance/engine processes the input received from the various sources, ascertains the thought units and identifies original thought units based on the knowledge graph, and compares them to a current inventory of original thought units. This may be offered as a service (e.g. to customers) and implemented using a container technology to instantiate containers for processing in public and/or private deployment models. Further in an embodiment, two instances of data stores may be provided—a first data store to store the knowledge graph and a second data store to store the original thought units/ideas and results. A visual portal, for instance a web-based or mobile application-based portal, can be provided that allows the service-recipient and/or individual users to explore the captured original thought units and possible matches. For example, an individual user could view the thought units captured from his/her expressions and receive indications on the interface of the portal that indicate which are original ideas. The portal interface could also display which participants are, or are to be, interlinked based on similarity in their original ideas, and can also indicate the ideas of others which have been identified as corresponding to the ideas of the individual user.

Figure 5:
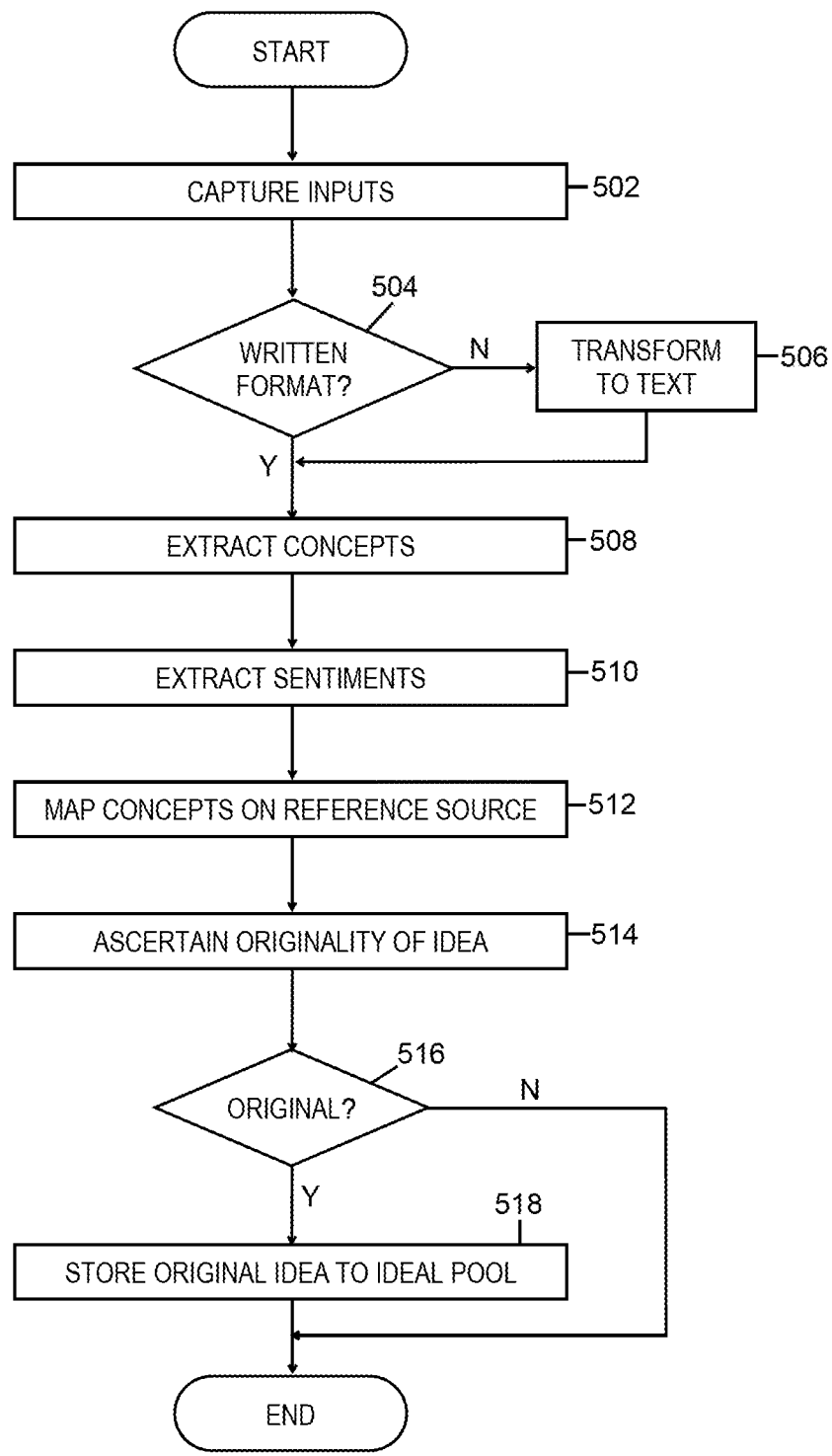
FIG. 5 depicts an example process for original idea extraction from written text data, in accordance with aspects described herein.

FIG. 5 depicts an example process for original idea extraction from written text data, in accordance with aspects described herein. Aspects of the process may be performed by one or more computer systems. Initially, various data sources are used to capture inputs (502) such as written text, voice, drawings, gestures, and other formats. The process then determines whether input is in a written text format (504). Any such input that is not in written text format is transformed to written text data (506). The particular technique applied to perform this transformation may depend on the particular input/input source, though existing transformation techniques may be leveraged to perform such transformation.

Using stemming and/or other approach(es), the process extracts concepts expressed from the written text data (508) and extracts sentiment (e.g. positive, neutral, negative) for each concept (510). The process then maps the extracted concepts onto the reference data source, such as a knowledge graph as in the examples described herein (512).

The process then ascertains originality of the idea (514), for example by computing the maximum shortest path between each pair of concepts of the thought unit. If the maximum shortest path is longer than a certain threshold value, the combination of concepts may be viewed as novel and the complete thought unit classified as novel/original.

A determination is made as to whether the idea is original (516), e.g. 'yes' or 'no', as ascertained by 514). The determination may be based on whether the threshold was exceeded. If so (516, Y), the process stores the identified novel idea—the complete thought unit—in an idea pool (518), for instance a database or other collection of representations of the ideas. Otherwise the idea is not original (516, N), and the process ends.

Figure 6:
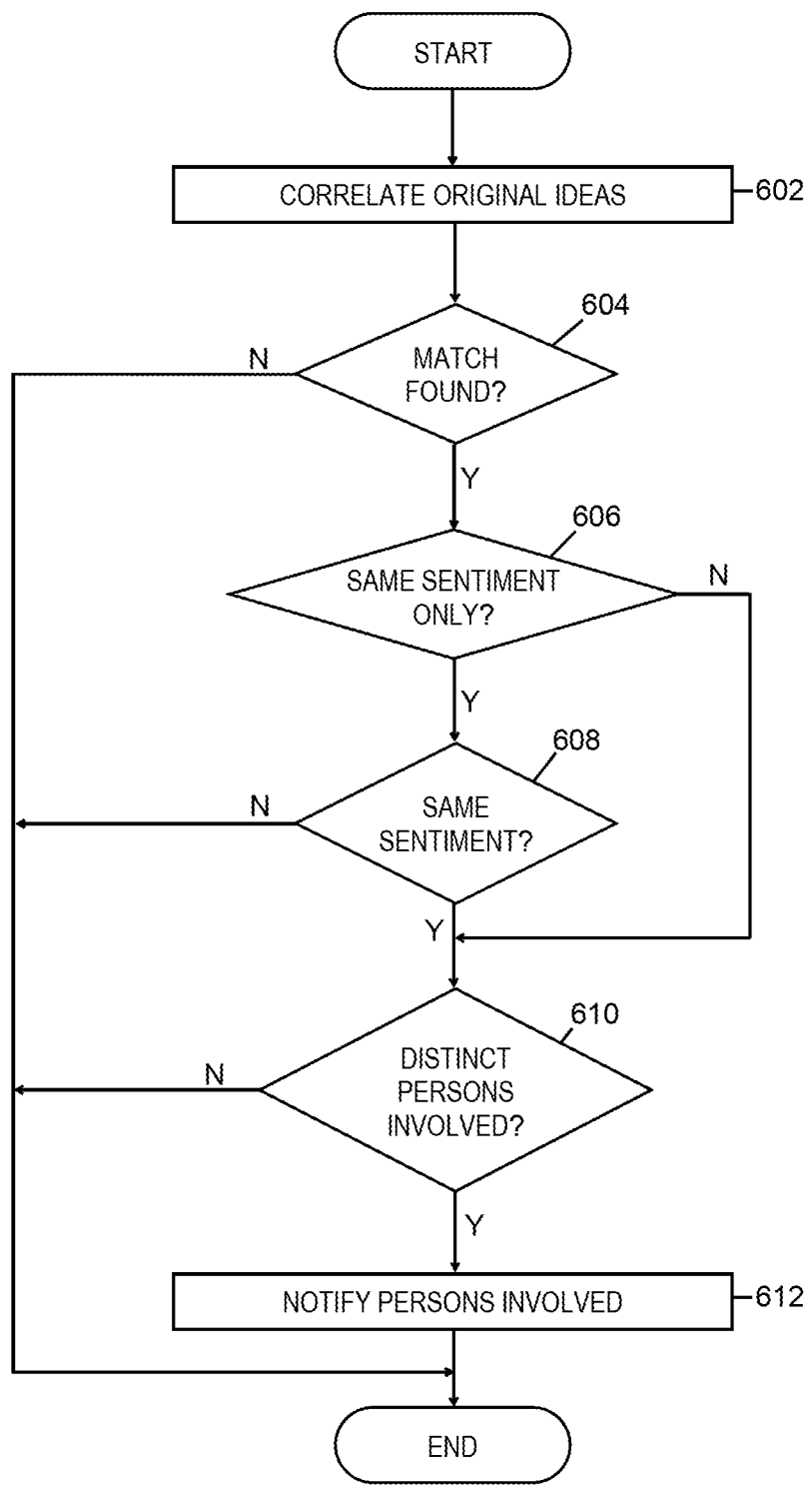
FIG. 6 depicts an example process for networking individuals together who express overlapping concepts in original ideas, in accordance with aspects described herein.

FIG. 6 depicts an example process for networking individuals together who express overlapping concepts in original ideas, in accordance with aspects described herein. Aspects of the process may be performed by one or more computer systems. Initially, an attempt is made to correlate an original idea newly discovered and/or in the idea pool with other ideas of the idea pool. It is determined whether there is a match found (604) between two original ideas. A match may be found when at least one combination of concepts common to two thought units has a shortest path between the correlated concepts in the knowledge graph that is longer than the threshold value. If no match is found (604, N) then the process ends.

Otherwise, a match is found (604, Y) and the individuals are potentially to be linked together. Then, it is determined whether sentiment of the original ideas is to influence the notification of the involved persons (i.e. whether sentiment matters to the matching) (606). This is made with an inquiry as to whether a particular sentiment goal exists. In this example, a same (or similar) sentiment of the two ideas is a pre-requisite for networking the two individuals who expressed the matched thought units. If only same/similar sentiments are allowed (606, Y), the process proceeds by determining whether the same sentiment is present in both original ideas (608). If the same sentiment is not present in the original ideas (608, N), the condition for networking is not satisfied, and the process ends.

If instead at 606 it was determined that any sentiment is allowed, or after determining at 608 that the two original ideas have a same/similar sentiment, the process proceeds by determining whether distinct persons were involved in the expression of each of the two original thought units (610), i.e. whether it was the same group of people who were involved in the expression of both thought units. If distinct persons were not involved (610, N), the process ends and no notification to network the individuals is triggered. Otherwise, the process notifies the involved group of people (612), for instance by way of electronic alerts, communications, app notifications, or indications on a graphical user interface that the person accesses. This can enable the group of people to collaborate in exploring the same/similar idea.

Accordingly, provided is a system capable of identifying novel ideas characterized by the new composition of known concepts and stored in a reference source with logical links between the concepts, and networking together authors of similar novel ideas. In some examples, a novel idea is defined based on a mathematical distance between the concepts of the idea as represented in a knowledge graph. The distance may be proportional to a number of logical links that connect the concepts. A reference source to which the expressed thought units are mapped may be represented through a knowledge graph. Additionally, multiple factors may be used to bridge similar ideas and network together the expressing users. Sentiment (positive and negative) of the idea, and the particular individuals involved in the expression of the idea and contribution to the idea are example factors.

Aspects described herein advantageously enable links between what is being expressed and already existing concepts derived from a corpus of information, to detect novelty and commonalities. This is in contrast to approaches, for example those that find co-occurrences of a same term in social media or other posts and create a direct relationship between entities, where there is also no cognitive component to ascertain and link new ideas.

Figure 7:
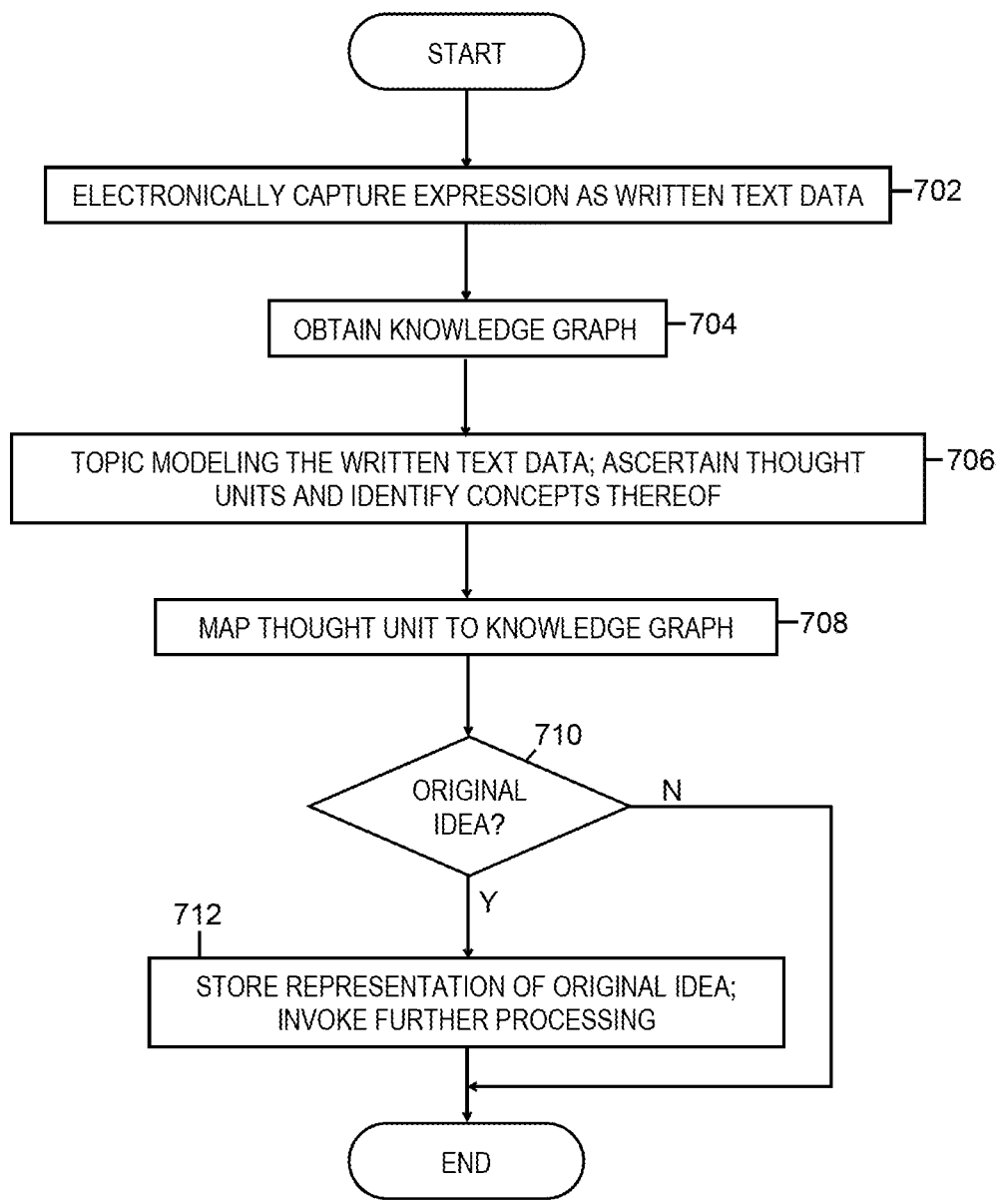
FIG. 7 depicts an example process of identifying an original idea, in accordance with aspects described herein.

FIG. 7 depicts an example process of identifying an original idea, in accordance with aspects described herein. Aspects of the process of FIG. 7 may be performed by one or more computer systems, and different aspects may be performed by different computer systems, such as those described herein, which may include one or more mobile or wearable devices, sensors, backend analytical platforms or server computer systems, one or more cloud servers, and/or any other computer system(s).

The process begins by electronically capturing expression of one or more individuals as written text data (702) using one or more electronic devices. The written text data may be in text form as received, or it may be derived from expressions in other forms (voice, gestures, drawings, etc.), which expressions are transformed to written text data. Thus, by way of example, the capturing expression as written text data can include capturing and transforming a voice stream of a user to a textual representation of the voice stream, and/or capturing and transforming drawings and/or user gestures to a textual representation.

The process continues by obtaining a knowledge graph data structure for a knowledge dataset (704). Obtaining can include obtaining it from another source or building it, as examples. An example dataset is the Wikipedia collection of articles. The knowledge graph can include representations of concepts (i.e. as nodes of the graph) and relationships between the concepts (i.e. as edges of the graph) as identified from the knowledge dataset. The knowledge graph may be an extended version of a knowledge graph, as described further with reference to FIG. 9. Additionally or alternatively the knowledge graph may be a subset derived from a larger knowledge graph.

Continuing with FIG. 7, the process automatically topic-models the written text data to ascertain a plurality of thought units expressed in the written text data and identify, for each thought unit, a respective set of concepts of the thought unit (706). The analysis identifies topics/thought units and from there it can be determined which concepts belong to which thought units.

The concepts of the thought unit can include not only concepts that were explicitly expressed in the written text data as the thought unit, but also concept(s) identified from other information, for instance those identified from a context in which the thought unit was expressed. One example is an expression made at a conference for the treatment of a given health affliction. The concept that is the given health affliction, though perhaps not explicitly mentioned in the thought unit, may be added to the thought unit on the basis that it was a context in which the thought unit was expressed.

The thought unit can be characterized by an identification of an individual expressing the thought unit, the identified concepts of the thought unit, at least one sentiment score of the thought unit, and an indication of any other individuals receiving a communication in which the thought unit was expressed by the individual.

The process of FIG. 7 continues by mapping a thought unit of the plurality of thought units to the knowledge graph (708) by correlating the concepts of the thought unit to a correlated set of concepts represented in the knowledge graph. The correlated set of concepts represented in the knowledge graph are the concepts of the knowledge graph (represented as nodes therein) to which the thought unit concepts map. The concepts of the thought unit and the correlated set of concepts may be the same concepts. The process then determines whether the thought unit is an original idea (710). As an example, this can be based on a graph distance in the knowledge graph between at least some of the correlated concepts represented in the knowledge graph, as explained with reference to FIG. 10. Additionally or alternatively, determining whether the thought unit is an original idea may be based on a cardinality of the set of concepts of the thought unit exceeding a threshold. In this regard, novelty of a thought unit may be based in part on the number of concepts of the thought unit.

Figure 11:
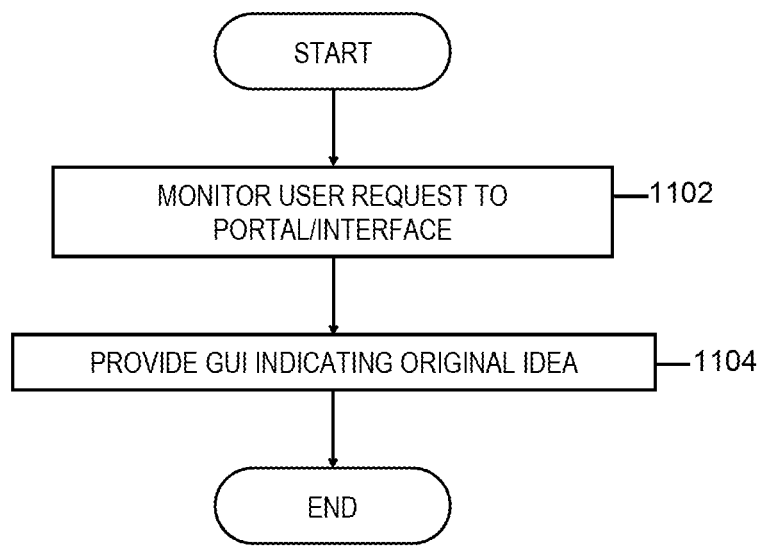
FIG. 11 depicts an example process for invoking processing of at least one computer, in accordance with aspects described herein.
Figure 12:
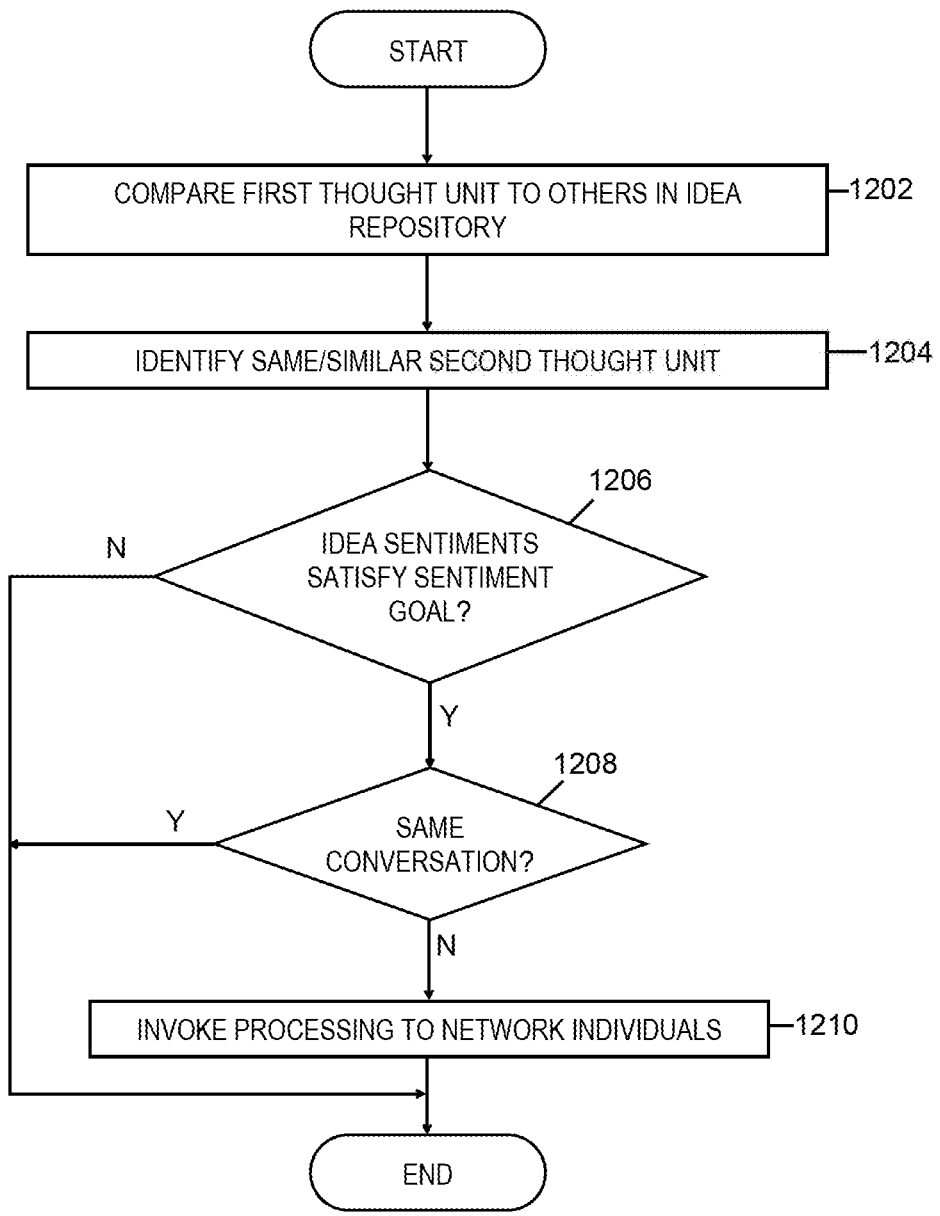
FIG. 12 depicts another example process for invoking processing of at least one computer, in accordance with aspects described herein.

If the thought unit is determined not to be an original idea (710, N), the process ends. Otherwise, based on determining that the thought unit is an original idea (710, Y), the process stores a representation of the original idea to an idea repository and invokes further processing, for instance of at least one computer (712). Example further processing is the processing to send a notification to a user (e.g. a computer system of the user) or provide a portal interface that informs an individual/user of the original idea. Other example further processing is processing to send some communication to an individual to network that person with another person who had a same/similar original idea. FIGS. 11 and 12 illustrate these examples.

Obtaining the knowledge graph (704) can include assigning weights to the concepts represented in the knowledge graph. The determining that the thought unit is an original idea can be further based on those weights assigned to the correlated concepts represented in the knowledge graph. The weight assigned to a concept represented in the knowledge graph may be based on at least an area of innovation to which the concept pertains and/or a frequency or trend in coverage of the concept in news media, as examples. An embodiment in which obtaining the knowledge graph includes assigning weights to the concepts represented therein and the determining that the thought unit is an original idea is based on the weights has an advantage that it enables different concepts to contribute differently to the determination of originality, enabling concepts to be emphasized and deemphasized as desired to influence the prominence and contribution requirement for some concepts in the processing to identify original ideas. An embodiment where the weight assigned to a concept represented in the knowledge graph may be based on at least an area of innovation to which the concept pertains and/or a frequency or trend in coverage of the concept in news media is also useful for enabling popular, trending, or frequently covered concepts to be emphasized and deemphasized as desired to influence the prominence and contribution requirement for some concepts in identified original ideas.

Additionally or alternatively, an optional aspect assigns relevance scores to the concepts of the thought unit. The determining that the thought unit is an original idea may be further based on the relevance scores assigned to the concepts. An embodiment in which relevance scores are assigned to the concepts of the thought unit and the determining that the thought unit is an original idea is further based on the relevance scores assigned to the concepts has an advantage that it enables different concepts to contribute differently to the determination of originality, enabling concepts to be emphasized and deemphasized as desired to influence the prominence and contribution requirement for some concepts in identified original ideas.

In addition to the above, sentiment scores of thought units may be ascertained and a determination made based thereon about whether to network together individuals based on the sentiment scores of same/similar expressions.

Figure 8:
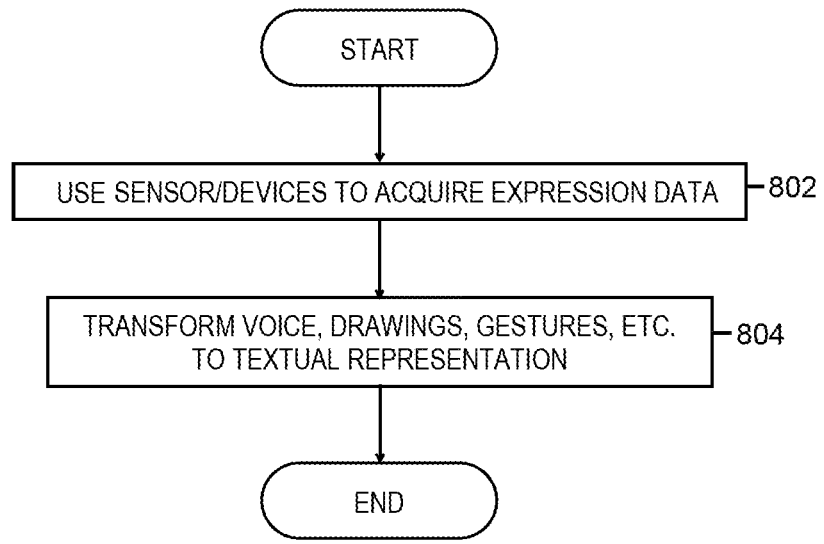
FIG. 8 depicts an example process for capturing expression of an individual as written text data, in accordance with aspects described herein.

FIG. 8 depicts an example process for capturing expression of an individual as written text data, in accordance with aspects described herein. The process may be performed by one or more computer systems. The process initially uses sensors/devices to acquire expression data (802). Expression data may be electronic computer data that captures, contains, represents, or indicates one or more expressions of the individual. As examples, the acquisition acquires documents, captures voice, drawings, gestures, etc. using sensors/devices. The process then transforms each expression data that is not written text data (voice stream, drawings, gestures, etc.) to a textual representation (804), i.e. to capture the expression data as written text data, and ends.

Figure 9:
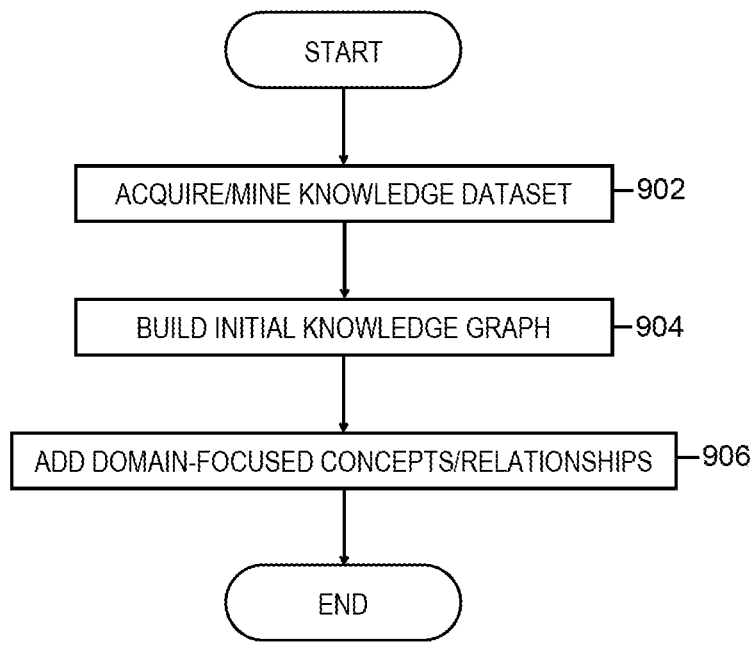
FIG. 9 depicts an example process for obtaining a knowledge graph data structure, in accordance with aspects described herein.

FIG. 9 depicts an example process for obtaining a knowledge graph data structure, in accordance with aspects described herein. The process may be performed by one or more computer systems. In this particular example, the process acquires/mines a knowledge dataset (902) and builds an initial knowledge graph (904) in the form of stored data structure(s). In an alternative embodiment, the initial knowledge graph may have been previously built and obtained from another source. In any case, the process then extends this initial knowledge graph based on a specific technical or scientific domain to obtain the extended knowledge graph. This extension adds representations of additional domain-focused concepts and additional domain-focused relationships between concepts represented in the initial knowledge graph (906).

Figure 10:
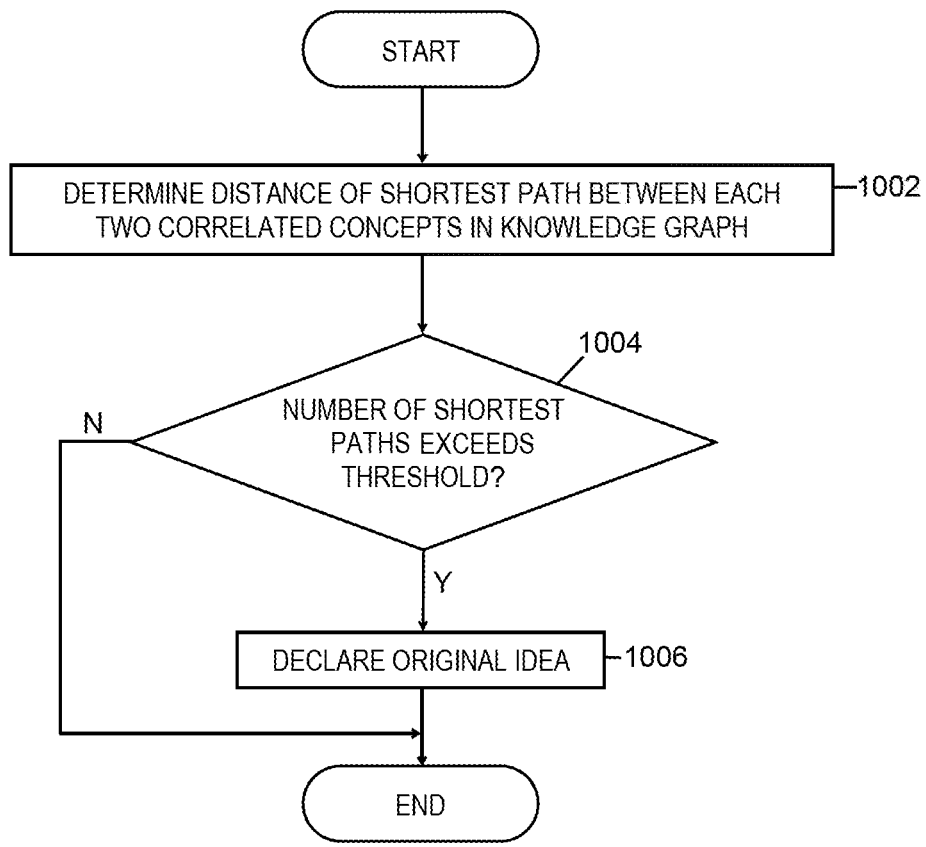
FIG. 10 depicts an example process for determining whether a thought unit is an original idea, in accordance with aspects described herein.

FIG. 10 depicts an example process for determining whether a thought unit is an original idea, in accordance with aspects described herein. The process may be performed by one or more computer systems. The process determines, for each pair of concepts of the correlated concepts represented in the knowledge graph, a respective shortest graph distance between the pair of concepts (1002). This forms a collection of distances of the shortest paths, one for each pair of concepts of the thought unit.

The process then determines whether a number of shortest paths exceeds a threshold (1004). The shortest paths are the shortest graph distances between the given pair of concepts represented in the knowledge graph. A threshold may be set and the determining (1104) determines whether there are at least that many shortest paths of the collection. For each pair of concepts, it is determined whether the shortest graph distance between the pair of concepts of the correlated concepts represented in the knowledge graph exceeds the threshold. The thought unit may be deemed an original idea if it is determined that the shortest graph distance between the pair of concepts exceeds the threshold. In the case where there is to be multiple shortest paths, between different pairs of nodes, that exceed the threshold, then the thought unit may be deemed an original idea if it is determined that each shortest graph distance between additional pair(s) of concepts of the correlated concepts represented in the knowledge graph exceeds the threshold.

Thus, if a number of shortest paths does exceed the threshold (1004, Y), the process declares the idea an original idea, otherwise, or if at 1004 it was determined that the number of shortest paths does not exceed the threshold, the process ends.

An embodiment in which determining whether a thought unit is an original idea includes determining a respective shortest graph distance between each pair of concepts and determining whether a number of shortest paths exceeds some threshold(s) has an advantage that the determination of originality may be tailored as desired using thresholding and based on distances between concepts.

FIG. 11 depicts an example process for invoking processing of at least one computer, in accordance with aspects described herein. The process may be performed by one or more computer systems, and the at least one computer may or may not be of the one or more computer systems performing the process of FIG. 11. The process involves processing to indicate an original idea to an individual via a portal or other interface that the individual can view and access from a computer system. The process initially monitors for a user request to the portal or interface (1102), for instance a request to load a webpage with the portal or an invocation of execution of a mobile app providing the portal. Then, the process invokes provision of a graphical user interface that indicates the representation of the original idea to the individual who expressed the thought unit (1104). This notifies the individual that the thought unit is an original idea. In addition to a portal, example interfaces include an interface of an email, text, notification or other application.

FIG. 12 depicts another example process for invoking processing of at least one computer, in accordance with aspects described herein. The process may be performed by one or more computer systems, and the at least one computer may or may not be of the one or more computer systems performing the process of FIG. 12. The process compares a first original thought unit of a first individual to other original thought units, of other individuals, determined to be original ideas and having representations thereof stored in the idea repository (1202). Then the process identifies a same or similar second thought unit, of the other thought units, for which the first thought unit and the second thought unit share a common pair of concepts represented in the knowledge graph (1204). Different individuals may have expressed the different first and second ideas.

The process continues by determining whether idea sentiments of the two original ideas satisfy a sentiment goal for networking the first and second individuals (1206) who expressed the first and second original ideas. The sentiment goal may be, for instance, a substantial similarity (e.g. within X % or range) or match (positive/positive, negative/negative, neutral/neutral) in the idea sentiments, or may be a substantial dissimilarity or mismatch (positive/negative, negative/positive) in the idea sentiments, as examples.

If the idea sentiments do not satisfy the sentiment goal, the process ends. Otherwise, the process continues by determining whether the expression of the first thought unit by the first individual and expression of the second thought unit by the second individual were made in a common conversation between the first individual and second individual (1208). If so (1208, Y), the process ends. Otherwise, if not (1208, N), the process invokes processing to network individuals (121), for instance providing a first electronic communication to a first computer of the first individual and providing a second electronic communication to a second computer of the second individual, the first and second electronic communications to network together the first and second individuals.

An embodiment in which a method includes comparing thought units and identifying ones that are same/similar has an advantage that correlation of same/similar ideas can be leveraged to, for instance, bring the idea generators together. An embodiment which invokes processing to provide electronic communications to network individuals together based on idea similarity has an advantage that aspects can network individuals with other individuals having similar ideas to foster collaboration and innovation. An embodiment that networks such individuals only if their expressions of the ideas were not made in a common conversation has an advantage of refraining from attempting to network individuals who are already networked by virtual of them being involved in the conversation. Additionally, an embodiment in which a method ascertains sentiment scores of thought units and determines whether to network together individuals based on the sentiment scores of their expressions has an advantage that it enables tailoring which individuals are introduced to each other based on their sentiments. This can advantageously give selectability and control to bring together individuals with common sentiments, opposing sentiments, or some other desired relation between their expressed sentiments. The tone and sentiments in the fostered meaningful discourse may be controlled in this manner.

Although various examples are provided, variations are possible without departing from a spirit of the claimed aspects.

Figure 13:
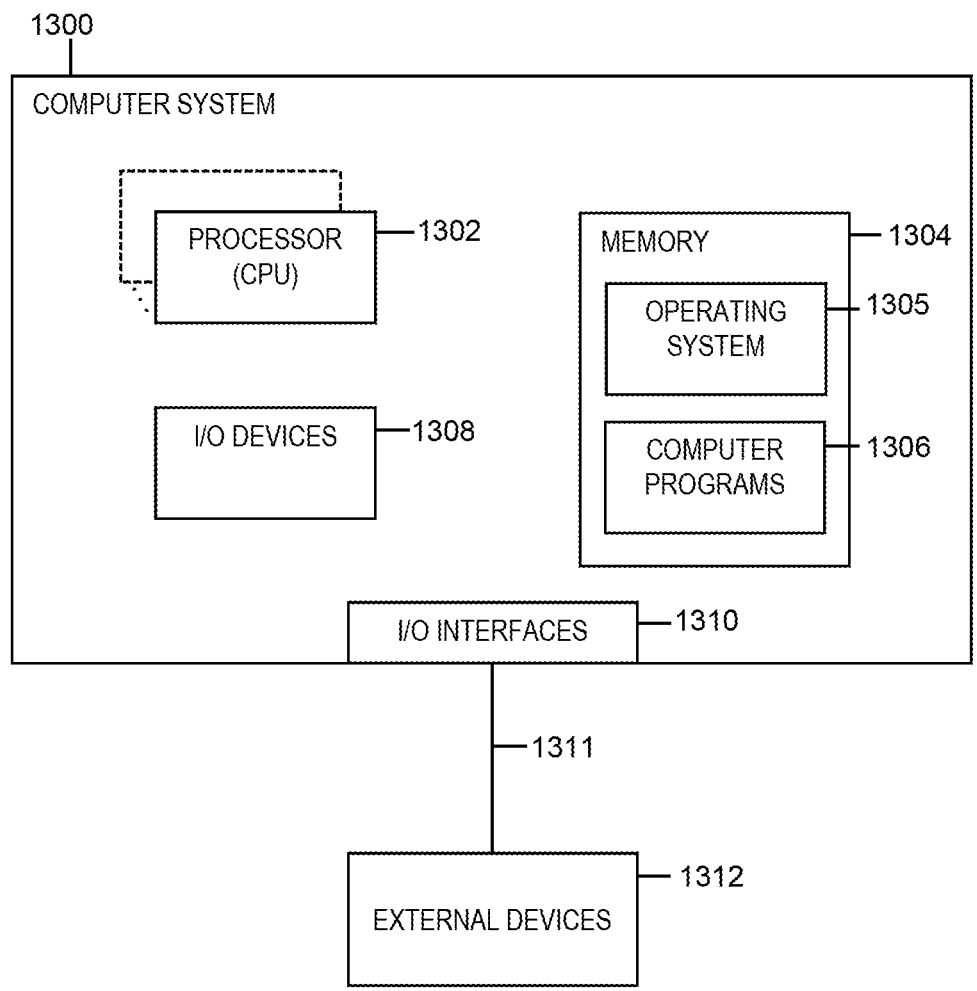
FIG. 13 depicts one example of a computer system and associated devices to incorporate and/or use aspects described herein.

Processes described herein may be performed singly or collectively by one or more computer systems. FIG. 13 depicts one example of such a computer system and associated devices to incorporate and/or use aspects described herein. A computer system may also be referred to herein as a data processing device/system, computing device/system/ node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 13 shows a computer system 1300 in communication with external device(s) 1312. Computer system 1300 includes one or more processor(s) 1302, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1302 can also include register(s) to be used by one or more of the functional components. Computer system 1300 also includes memory 1304, input/output (I/O) devices 1308, and I/O interfaces 1310, which may be coupled to processor(s) 1302 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1304 can be or include main or system memory (e.g. Random Access Memory) used in the execution of program instructions, storage device(s) such as hard drive(s), flash media, or optical media as examples, and/or cache memory, as examples. Memory 1304 can include, for instance, a cache, such as a shared cache, which may be coupled to local caches (examples include L1 cache, L2 cache, etc.) of processor(s) 1302. Additionally, memory 1304 may be or include at least one computer program product having a set (e.g., at least one) of program modules, instructions, code or the like that is/are configured to carry out functions of embodiments described herein when executed by one or more processors.

Memory 1304 can store an operating system 1305 and other computer programs 1306, such as one or more computer programs/applications that execute to perform aspects described herein. Specifically, programs/applications can include computer readable program instructions that may be configured to carry out functions of embodiments of aspects described herein.

Examples of I/O devices 1308 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1312) coupled to the computer system through one or more I/O interfaces 1310.

Computer system 1300 may communicate with one or more external devices 1312 via one or more I/O interfaces 1310. Example external devices include a keyboard, a pointing device, a display, and/or any other devices that enable a user to interact with computer system 1300. Other example external devices include any device that enables computer system 1300 to communicate with one or more other computing systems or peripheral devices such as a printer. A network interface/adapter is an example I/O interface that enables computer system 1300 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 1310 and external devices 1312 can occur across wired and/or wireless communications link(s) 1311, such as Ethernet-based wired or wireless connections. Example wireless connections include cellular, Wi-Fi, Bluetooth®, proximity-based, near-field, or other types of wireless connections. More generally, communications link(s) 1311 may be any appropriate wireless and/or wired communication link(s) for communicating data.

Particular external device(s) 1312 may include one or more data storage devices, which may store one or more programs, one or more computer readable program instructions, and/or data, etc. Computer system 1300 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1300 may be operational with numerous other general purpose or special purpose computing system environments or configurations. Computer system 1300 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 14.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 14:
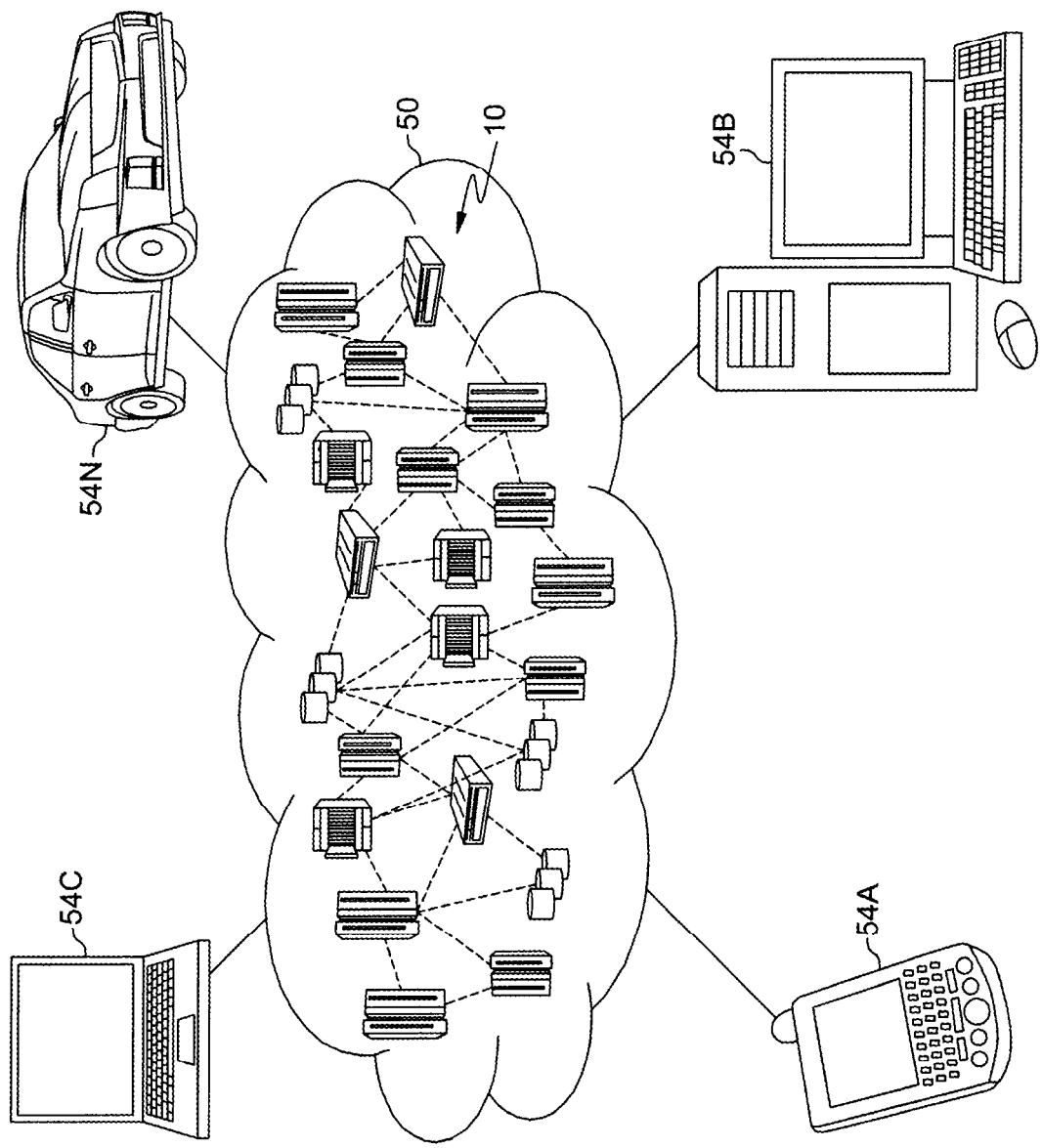
FIG. 14 depicts a cloud computing environment according to an embodiment of the present invention.

Referring now to FIG. 14, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
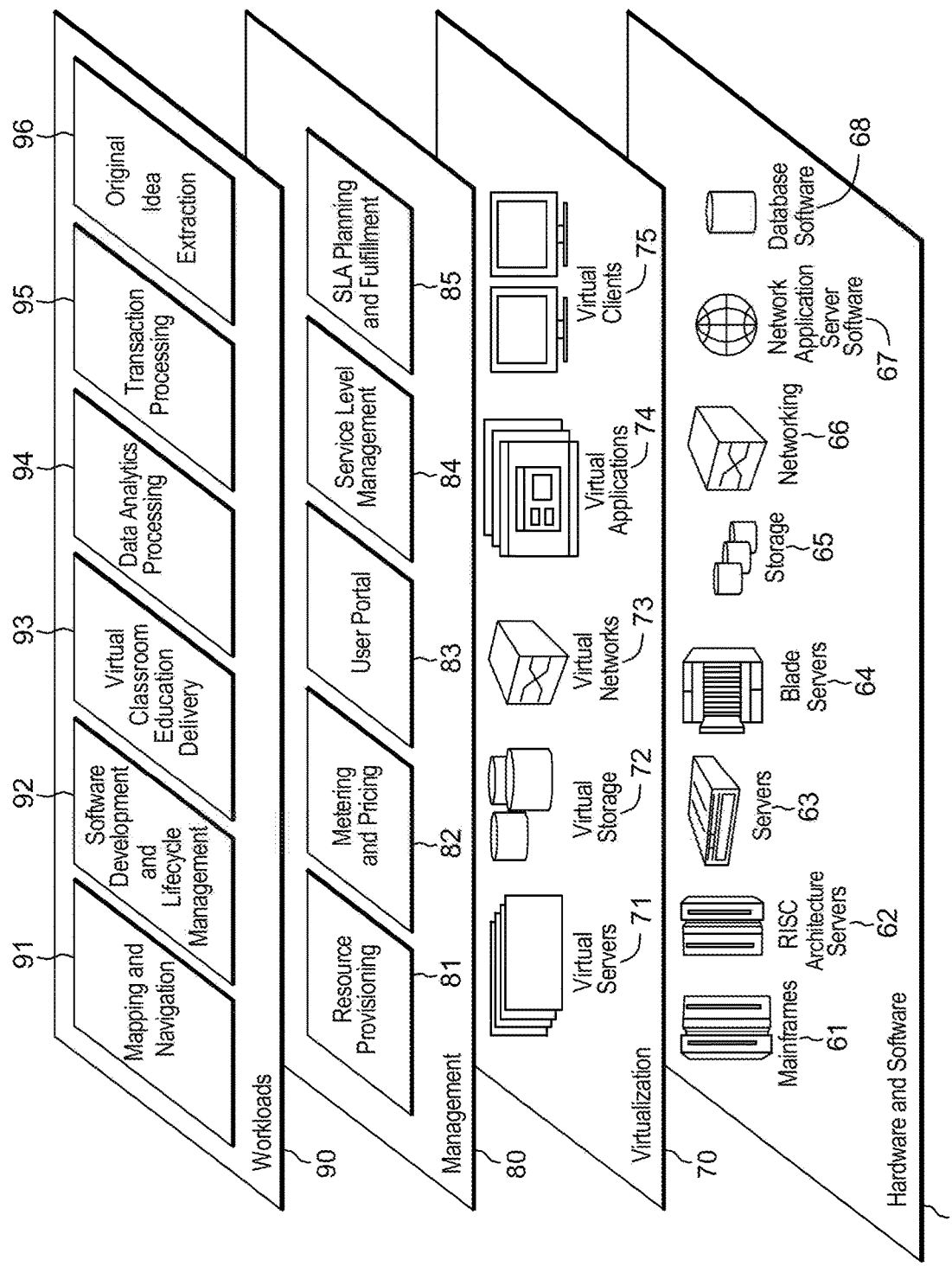
FIG. 15 depicts abstraction model layers according to an embodiment of the present invention.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and original idea extraction 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   electronically capturing expression of one or more individuals as written text data using one or more electronic devices;
   obtaining a knowledge graph data structure for a knowledge dataset, the knowledge graph comprising representations of concepts and relationships between the concepts as identified from the knowledge dataset;
   automatically topic modeling the written text data to ascertain a plurality of thought units expressed in the written text data, and identifying, for each thought unit, a respective set of concepts of the thought unit;
   mapping a thought unit of the plurality of thought units to the knowledge graph by correlating the concepts of the thought unit to a correlated set of concepts represented in the knowledge graph;
   determining that the thought unit is an original idea, the determining being based on a graph distance in the knowledge graph between at least some of the correlated concepts represented in the knowledge graph, wherein the determining that the thought unit is an original idea comprises:
      determining, for each pair of concepts of the correlated concepts represented in the knowledge graph, a respective shortest graph distance between the pair of concepts, and
      determining whether a shortest graph distance between a pair of concepts of the correlated concepts represented in the knowledge graph exceeds a threshold, wherein the through unit is deemed an original idea based on determining that the shortest graph distance between the pair of concepts exceeds the threshold; and based on determining that the thought unit is an original idea, storing a representation of the original idea to an idea repository and invoking processing of at least one computer.

2. The method of claim 1, wherein the capturing expression as written text data comprises transforming a voice stream of a user to a textual representation of the voice stream.

3. The method of claim 1, wherein the capturing expression as written text data comprises transforming at least one selected from the group consisting of: (i) drawings and (ii) user gestures, to a textual representation.

4. The method of claim 1, wherein the knowledge graph is an extended knowledge graph, and wherein the obtaining the extended knowledge graph further comprises obtaining an initial knowledge graph based on the knowledge dataset, and extending the initial knowledge graph based on a specific technical or scientific domain to obtain the extended knowledge graph, the extending adding representations of additional domain-focused concepts or additional domain-focused relationships between concepts represented in the initial knowledge graph.

5. The method of claim 1, wherein the concepts of the thought unit include concepts explicitly expressed in the written text data as the thought unit and one or more concepts identified from a context in which the thought unit was expressed.

6. The method of claim 1, wherein the thought unit is characterized by an identification of an individual expressing the thought unit, the identified concepts of the thought unit, at least one sentiment score of the thought unit, and an indication of any other individuals receiving a communication in which the thought unit was expressed by the individual.

7. The method of claim 1, wherein the determining that the thought unit is an original idea further comprises determining whether each shortest graph distance between at least one additional pair of concepts of the correlated concepts represented in the knowledge graph exceeds the threshold, wherein the thought unit is deemed an original idea based on determining that each shortest graph distance between the at least one additional pair of concepts exceeds the threshold.

8. The method of claim 1, wherein the determining that the thought unit is an original idea is further based on a cardinality of the set of concepts of the thought unit exceeding a threshold.

9. The method of claim 1, further comprising assigning relevance scores to the concepts of the thought unit, wherein the determining that the thought unit is an original idea is further based on the relevance scores assigned to the concepts.

10. The method of claim 1, wherein the obtaining the knowledge graph further comprises assigning weights to the concepts represented in the knowledge graph, and wherein the determining that the thought unit is an original idea is further based on the weights assigned to the correlated concepts represented in the knowledge graph.

11. The method of claim 10, wherein the weight assigned to a concept represented in the knowledge graph is based on at least one selected from the group consisting of: (i) area of innovation to which the concept pertains and (ii) a frequency or trend in coverage of the concept in news media.

12. The method of claim 1, wherein the invoking processing of at least one computer invokes provision of a graphical user interface that indicates the representation of the original idea to an individual, of the one or more individuals, who expressed the thought unit, to notify the individual that the thought unit is an original idea.

13. The method of claim 1, further comprising:
comparing the thought unit to other thought units determined to be original ideas and having representations thereof stored in the idea repository; and
identifying another thought unit, of the other thought units, for which the thought unit and the another thought unit share a common pair of concepts represented in the knowledge graph, wherein the one or more individuals comprise a first individual who expressed the thought unit and a second individual who expressed the another thought unit.

14. The method of claim 13, wherein based on determining that the expression of the thought unit by the first individual and expression of the another thought unit by the second individual were not made in a common conversation between the first individual and second individual, the invoking processing of the at least one computer comprises providing a first electronic communication to a first computer of the first individual and providing a second electronic communication to a second computer of the second individual, the first and second electronic communications to network together the first and second individuals.

15. The method of claim 14, further comprising:
ascertaining a first sentiment score of the thought unit and a second sentiment score of the another thought unit; and
determining whether to network together the first and second individuals based on the first and second sentiment scores.

16. A computer system comprising:
a memory; and
a processor in communication with the memory, wherein the computer system is configured to perform a method comprising:
electronically capturing expression of one or more individuals as written text data using one or more electronic devices;
obtaining a knowledge graph data structure for a knowledge dataset, the knowledge graph comprising representations of concepts and relationships between the concepts as identified from the knowledge dataset;
automatically topic modeling the written text data to ascertain a plurality of thought units expressed in the written text data, and identifying, for each thought unit, a respective set of concepts of the thought unit;
mapping a thought unit of the plurality of thought units to the knowledge graph by correlating the concepts of the thought unit to a correlated set of concepts represented in the knowledge graph;
determining that the thought unit is an original idea, the determining being based on a graph distance in the knowledge graph between at least some of the correlated concepts represented in the knowledge graph, wherein the determining that the thought unit is an original idea comprises:
determining, for each pair of concepts of the correlated concepts represented in the knowledge graph, a respective shortest graph distance between the pair of concepts; and
determining whether a shortest graph distance between a pair of concepts of the correlated concepts represented in the knowledge graph exceeds a threshold, wherein the thought unit is deemed an original idea based on determining that the shortest graph distance between the pair of concepts exceeds the threshold; and based on determining that the thought unit is an original idea, storing a representation of the original idea to an idea repository and invoking processing of at least one computer.

17. The computer system of claim 16, wherein the method further comprises assigning relevance scores to the concepts of the thought unit, wherein the determining that the thought unit is an original idea is further based on the relevance scores assigned to the concepts.

18. The computer system of claim 16, wherein the obtaining the knowledge graph further comprises assigning weights to the concepts represented in the knowledge graph, and wherein the determining that the thought unit is an original idea is further based on the weights assigned to the correlated concepts represented in the knowledge graph, wherein the weight assigned to a concept represented in the knowledge graph is based on at least one selected from the group consisting of: (i) area of innovation to which the concept pertains and (ii) a frequency or trend in coverage of the concept in news media.

19. The computer system of claim 16, wherein the method further comprises:

comparing the thought unit to other thought units determined to be original ideas and having representations thereof stored in the idea repository; and identifying another thought unit, of the other thought units, for which the thought unit and the another thought unit share a common pair of concepts represented in the knowledge graph, wherein the one or more individuals comprise a first individual who expressed the thought unit and a second individual who expressed the another thought unit, wherein based on determining that the expression of the thought unit by the first individual and expression of the another thought unit by the second individual were not made in a common conversation between the first individual and second individual, the invoking processing of the at least one computer comprises providing a first electronic communication to a first computer of the first individual and providing a second electronic communication to a second computer of the second individual, the first and second electronic communications to network together the first and second individuals.

20. A computer program product comprising:

a computer readable storage medium readable by at least one processor and storing instructions for execution by the at least one processor for performing a method comprising:

electronically capturing expression of one or more individuals as written text data using one or more electronic devices;

obtaining a knowledge graph data structure for a knowledge dataset, the knowledge graph comprising representations of concepts and relationships between the concepts as identified from the knowledge dataset;

automatically topic modeling the written text data to ascertain a plurality of thought units expressed in the written text data, and identifying, for each thought unit, a respective set of concepts of the thought unit;

mapping a thought unit of the plurality of thought units to the knowledge graph by correlating the concepts of the thought unit to a correlated set of concepts represented in the knowledge graph;

determining that the thought unit is an original idea, the determining being based on a graph distance in the knowledge graph between at least some of the correlated concepts represented in the knowledge graph, wherein the determining that the thought unit is an original idea comprises:

determining, for each pair of concepts of the correlated concepts represented in the knowledge graph, a respective shortest graph distance between the pair of concepts; and determining whether a shortest graph distance between a pair of concepts of the correlated concepts represented in the knowledge graph exceeds a threshold, wherein the thought unit is deemed an original idea based on determining that the shortest graph distance between the pair of concepts exceeds the threshold; and based on determining that the thought unit is an original idea, storing a representation of the original idea to an idea repository and invoking processing of at least one computer.

21. The computer program product of claim 20, wherein the method further comprises assigning relevance scores to the concepts of the thought unit, wherein the determining that the thought unit is an original idea is further based on the relevance scores assigned to the concepts.

22. The computer program product of claim 20, wherein the method further comprises:

comparing the thought unit to other thought units determined to be original ideas and having representations thereof stored in the idea repository; and identifying another thought unit, of the other thought units, for which the thought unit and the another thought unit share a common pair of concepts represented in the knowledge graph, wherein the one or more individuals comprise a first individual who expressed the thought unit and a second individual who expressed the another thought unit, wherein based on determining that the expression of the thought unit by the first individual and expression of the another thought unit by the second individual were not made in a common conversation between the first individual and second individual, the invoking processing of the at least one computer comprises providing a first electronic communication to a first computer of the first individual and providing a second electronic communication to a second computer of the second individual, the first and second electronic communications to network together the first and second individuals.

\* \* \* \* \*